(12) United States Patent
Caruk et al.

(10) Patent No.: US 12,287,753 B2
(45) Date of Patent: *Apr. 29, 2025

(54) ALTERNATIVE PROTOCOL OVER PHYSICAL LAYER

(71) Applicants: ATI Technologies ULC, Markham (CA); Advanced Micro Devices, Inc., Santa Clara, CA (US)

(72) Inventors: Gordon Caruk, Brampton (CA); Maurice B. Steinman, Marlborough, MA (US); Gerald R. Talbot, Concord, MA (US); Joseph D. Macri, San Francisco, CA (US)

(73) Assignees: ATI Technologies ULC, Markham (CA); Advanced Micro Devices, Inc, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,908

(22) Filed: Jun. 30, 2023

(65) Prior Publication Data

US 2023/0342325 A1 Oct. 26, 2023

Related U.S. Application Data

(63) Continuation-in-part of application No. 16/223,873, filed on Dec. 18, 2018, now Pat. No. 10,698,856, and
(Continued)

(51) Int. Cl.
*G06F 13/20* (2006.01)
*G06F 13/16* (2006.01)
*G06F 13/42* (2006.01)

(52) U.S. Cl.
CPC ...... *G06F 13/4282* (2013.01); *G06F 13/1689* (2013.01); *G06F 2213/0026* (2013.01)

(58) Field of Classification Search
CPC .. G06F 13/00; G06F 13/4221; G06F 13/1678; G06F 13/22; G06F 13/376; G06F 13/387
See application file for complete search history.

(56) References Cited

U.S. PATENT DOCUMENTS

2014/0173164 A1 6/2014 Ranganathan et al.
2016/0085707 A1 3/2016 Song et al.
(Continued)

OTHER PUBLICATIONS

International Search Report; International Application No. PCT/US2019/038531; mailed Oct. 8, 2019; 3 pages.
(Continued)

*Primary Examiner* — Henry Tsai
*Assistant Examiner* — Kim T Huynh
(74) *Attorney, Agent, or Firm* — Polansky & Associates, P.L.L.C.; Paul J. Polansky; Nathan H. Calvert

(57) ABSTRACT

A link controller includes a Peripheral Component Interconnect Express (PCIe) physical layer circuit for coupling to a communication link and providing a data path over the communication link, a first data link layer controller which operates according to a PCIe protocol, and a second data link layer controller which operates according to a non-PCIe protocol. A multiplexer-demultiplexer selectively connects both data link layer controllers to the PCIe physical layer circuit. A protocol translation circuit is coupled between the multiplexer-demultiplexer and the second data link layer controller, the protocol translation circuit receiving traffic data from the second data link layer controller in a non-PCIe format, encapsulating the non-PCIe format in a PCIe format, and passing traffic data to the multiplexer-demultiplexer circuit.

20 Claims, 11 Drawing Sheets

Related U.S. Application Data a continuation of application No. 16/427,020, filed on May 30, 2019, now Pat. No. 11,693,813.

(56) References Cited

U.S. PATENT DOCUMENTS

| | | |
|---|---|---|
| 2016/0267048 A1 | 9/2016 | Pethe et al. |
| 2017/0083475 A1 | 3/2017 | Wu et al. |
| 2018/0095920 A1* | 4/2018 | Kwak et al. |
| 2018/0329855 A1* | 11/2018 | Das Sharma ............ H04L 69/24 |
| 2019/0131974 A1* | 5/2019 | Das Sharma ........ G06F 13/4027 |
| 2019/0147923 A1* | 5/2019 | Pawlowski ............. H04L 47/10 |
| | | 711/149 |
| 2019/0303318 A1* | 10/2019 | Mao ........................ G06F 13/20 |

OTHER PUBLICATIONS

Written Opinion of the International Searching Authority; International Application No. PCT/US2019/038531; mailed Oct. 8, 2019; 8 pages.

"PCI Express® Base Specification—Revision 3.0"; White Paper; PCI-SIG; 3855 SW 153rd Drive, Beaverton, OR 97003; United States; Nov. 10, 2010; 860 pages.

* cited by examiner

LINK TRAINING AND STATUS STATE MACHINE (LTSSM)

ALTERNATIVE PROTOCOL OVER PHYSICAL LAYER

BACKGROUND

System interconnect bus standards provide for communication between different elements on a chip, or different elements with a multi-chip module, a circuit board, a server node, or in some cases an entire server rack or a networked system. For example, the popular Peripheral Component Interconnect Express (PCIe or PCI Express) is a high-speed serial expansion bus providing interconnection between elements on a motherboard, and connecting to expansion cards. Improved system interconnect standards are needed for multi-processor systems, and especially systems in which multiple processors on different chips interconnect and share memory.

The interconnection of multi-processor computing resources and the associated memory poses several challenges. Generally, memory capacity requirements increase as the number of interconnected processors and accelerators increases. Furthermore, new interconnect standards may be incompatible with older standards, such as PCIe, and therefore render obsolete various system components and expansion devices which employ the older standards.

Figure 1:
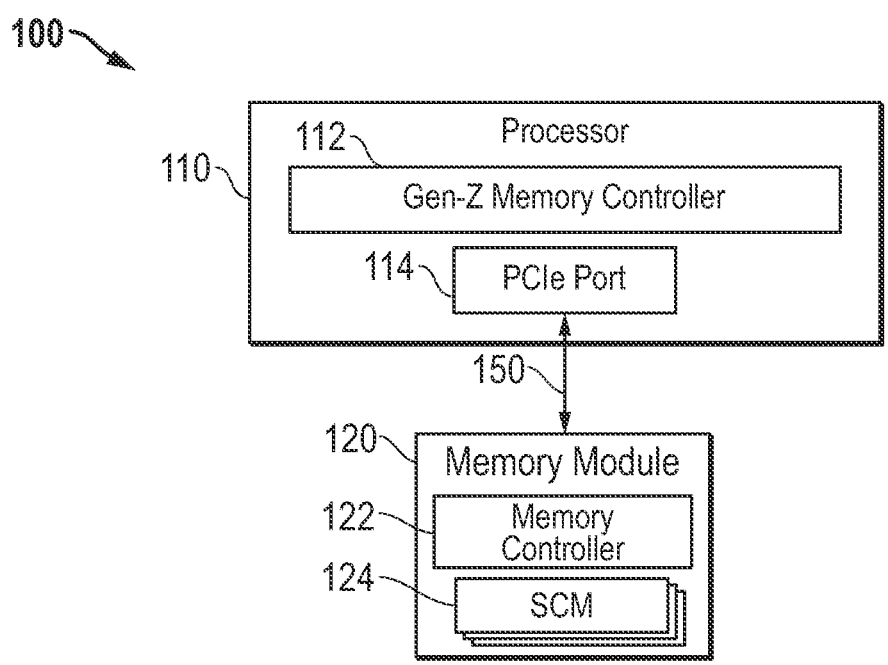
FIG. 1 illustrates in block diagram form a data processing platform with a PCIe memory module according to the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A link controller includes a Peripheral Component Interconnect Express (PCIe) physical layer circuit, first and second data link layer controllers, a multiplexer-demultiplexer, and a protocol translation circuit. The link controller is connected to a communication link and provides a data path over the communication link. The first data link layer controller operates according to a PCIe protocol, and the second data link layer controller operates according to a non-PCIe protocol. The multiplexer-demultiplexer is coupled to the first data link layer controller, the second data link layer controller, and the physical layer circuit. The protocol translation circuit is coupled between the multiplexer-demultiplexer and the second data link layer controller, and receives traffic data from the second data link layer controller in a non-PCIe format, encapsulates the non-PCIe format in a PCIe format, and passes traffic data to the multiplexer-demultiplexer circuit.

A method includes selectively causing a multiplexer-demultiplexer to couple a PCIe physical layer circuit through a protocol translation circuit to a non-PCIe data link layer controller. At the protocol translation circuit, traffic data is received from the non-PCIe data link layer controller in a non-PCIe format. The non-PCIe formatted traffic data is encapsulated in a PCIe format, and passed through the multiplexer-demultiplexer to the PCIe physical layer circuit. The traffic data is transmitted with the encapsulated format over a communication link from the PCIe physical layer circuit.

A data processing platform includes a central processing unit and a dual-protocol link controller connected to the central processing unit. The dual-protocol link controller includes a PCIe physical layer circuit, first and second data link layer controllers, a multiplexer-demultiplexer, and a protocol translation circuit. The PCIe physical layer circuit is coupled to a communication link and provides a data path over the communication link. The first data link layer controller operates according to a PCIe protocol, and the second data link layer controller operates according to a non-PCIe protocol. The multiplexer-demultiplexer is coupled to the first data link layer controller, the second data link layer controller, and the physical layer circuit. The protocol translation circuit is coupled between the multiplexer-demultiplexer and the second data link layer controller, and receives traffic data from the second data link layer controller in a non-PCIe format, encapsulates the non-PCIe format in a PCIe format, and passes traffic data to the multiplexer-demultiplexer circuit.

FIG. 1 illustrates in block diagram form a data processing platform 100 with a PCIe memory module 120 according to the prior art. Data processing platform 100 includes a processor 110 having a memory controller 112 and a PCIe port 114 connected to a PCIe bus 150. Expansion memory for data processing platform 100 is provided by a PCIe memory module 120 connected to PCIe bus 150. PCIe memory module 120 includes a memory controller 122 communicating with PCIe bus 150, and a storage class memory (SCM) 124, including multiple memory chips providing persistent memory storage.

Figure 2:
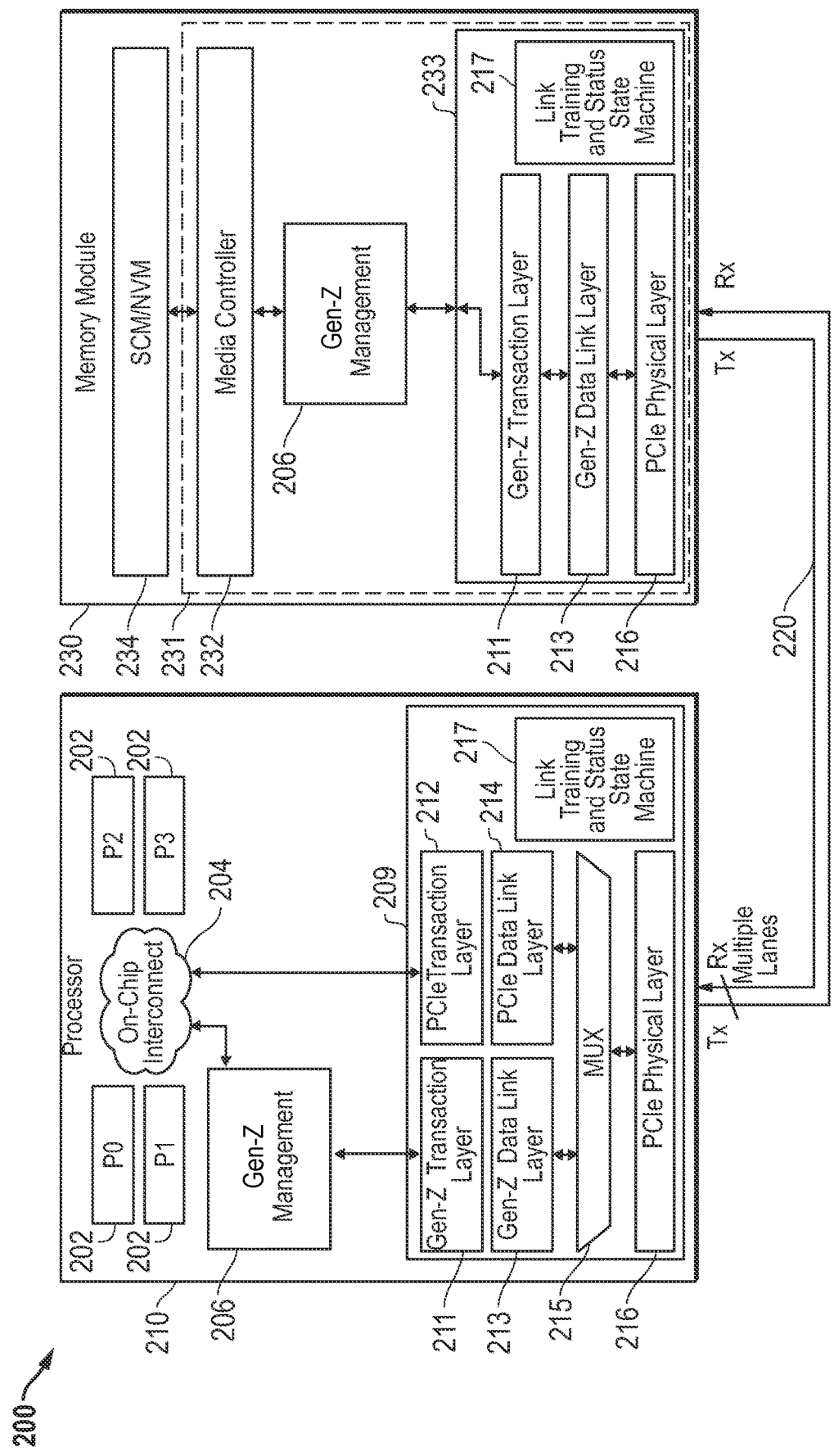
FIG. 2 illustrates in block diagram form a data processing platform according to some embodiments.

FIG. 2 illustrates in block diagram form a data processing platform 200 according to some embodiments. Processor 210 communicates with a memory module 230 using a Gen-Z protocol, which is a data access technology for enhancing memory solutions for existing and emerging memory technologies. The Gen-Z protocol is found in Gen-Z Core Specification 1.0 published by Gen-Z Consortium, Inc., and in later versions of the standard. Gen-Z provides an abstract device interface that supports a variety of memory types, including a number of byte-addressable, persistent storage class memory technologies. Gen-Z provides a platform for fabric attached memory, scaling from point-to-point connections to local memory expansion through local high-speed busses and switched busses, to rack-scale solutions. To support a variety of current and future memory subsystems, Gen-Z provides a universal interface between processors and their memory subsystems. With this interface, the components communicate using memory-semantic requests with application-specific semantic overlays to derive meaning and drive type-specific actions. Generally, to communicate via Gen-Z protocol, processors and memory modules would interact using a Gen-Z Physical Layer, which is significantly different than a PCIe Physical Layer. Communicating using a PCIe Physical Layer provides advantages in the efficiency of PHY designs and component pinouts, and provides a transition path for adoption of Gen-Z technology. In a PCIe protocol-based system, processors communicate with memory modules using PCIe protocol over a PCIe Physical Layer. Host processor 210 communicates with memory module 230 over a PCIe bus 220, but is able to recognize that a Gen-Z device is connected and configure a dual-protocol link controller 209 to communicate using a Gen-Z protocol as an alternative protocol over a PCIe Physical Layer.

Host processor 210 includes four processor cores 202, interconnected by an on-chip interconnect network 204. This number of processor cores 202 is merely an example, and the processor cores employed for various data processing platforms will often include many more processor cores, such as 32 or 64 cores all connected with an on-chip interconnect network. As shown, on-chip interconnect network 204 links each processor core to a PCIe input of dual-protocol link controller 209 for PCIe traffic, and to Gen-Z management block 206 for memory access to memory module 230. In this embodiment, dual-protocol link controller 209 includes a PCIe external port including PCIe hardware enhanced to include Gen-Z alternative protocol capability. This capability is provided by Gen-Z transaction layer controller 211, Gen-Z data link layer controller 213, and the PCIe physical layer circuit 216. Dual-protocol link controller 209 provides a Gen-Z protocol interconnect to memory module 230 that is overlaid on a PCIe physical link on PCIe bus 220.

Gen-Z management block 206 typically includes processor memory management logic, and may include other logic circuits such as request queues or a memory directory. On-chip interconnect network 204 sends and receives memory requests and responses through a Gen-Z management block 206, which prepares and formats messages according to the Gen-Z protocol. Gen-Z management block 206 connects to Gen-Z transaction layer controller 211 of dual-protocol link controller 209.

Dual-protocol link controller 209 includes a Gen-Z transaction layer controller 211 which is connected to Gen-Z management block 206 for communicating memory access requests through Gen-Z management block 206 in the upstream direction. Gen-Z transaction layer controller 211 is connected to Gen-Z data link layer controller 213 for providing and receiving Gen-Z packets in the downstream direction. Gen-Z data link layer controller 213 generally manages the Gen-Z communication link through PCIe bus 220, performing link setup, sequencing packets, and controlling the flow of data over the link.

Multiplexer-demultiplexer 215 selectively connects PCIe physical layer circuit 216 to Gen-Z data link layer controller 213 or PCIe data link layer controller 214, allowing a Gen-Z link or a PCIe link to be completed through PCIe physical layer circuit 216. PCIe physical layer circuit 216 is connected to multiplexer-demultiplexer 215, and operates to create signals for transmission over PCIe bus 220 through a unidirectional transmit port labeled "TX", and to receive signals over unidirectional receive port labeled "RX". The operation of multiplexer-demultiplexer 215 is controlled by settings provided during initialization of dual-protocol link controller 209 by link training and status state machine (LTSSM) 217, as further described below.

On-chip interconnect network 204 includes another path for processors 202 to communicate through dual-protocol link controller 209 using the PCIe protocol through connection to PCIe transaction layer controller 212. This path is provided for normal PCIe traffic, allowing PCIe capable devices to be connected to PCIe bus 220 as an alternative or in addition to the memory module 230, which operates with a Gen-Z protocol. A PCIe device may be connected to PCIe bus 220 instead of memory module 230. PCIe transaction layer controller 212 is connected to PCIe data link layer controller 214, which selectively connects to PCIe physical layer circuit 216 through multiplexer-demultiplexer 215, as further described below. PCIe transaction layer controller 212 and PCIe Data Link layer controller 214 operate as known in the art.

The blocks of dual-protocol link controller 209 can be implemented with various combinations of hardware, firmware, and software. In this embodiment, dual-protocol link controller 209 is implemented entirely in hardware. In another exemplary implementation, PCIe physical layer circuit 216 is implemented in hardware, PCIe transaction layer controller 212 is implemented in software, and PCIe data link layer controller 214 is implemented partially in hardware and partially in software. Gen-Z management block 206 is implemented in software, Gen-Z transaction layer controller 211 is implemented partially in hardware and partially in software, and Gen-Z data link layer controller 213 is implemented in hardware.

Memory module 230 may be an expansion card type module with a PCIe connector, or may take the form of other expansion modules and/or be built into the motherboard carrying host processor 210. Memory module 230 includes a memory 234 with one or more memory chips connected to an interface controller 231 over a high-speed local bus. Interface controller 231 includes a media controller 232, a Gen-Z management block 206, and a link controller 233. Media controller generally executes memory access requests to memory 234. Gen-Z management block 206 is connected to media controller 232 and prepares and formats messages according to the Gen-Z protocol. Gen-Z management block 206 serves as a logical port for Gen-Z communications from media controller 232, and connects to Gen-Z transaction layer controller 211 of link controller 233.

Link controller 233 includes Gen-Z transaction layer controller 211, Gen-Z data link layer controller 213, PCIe physical layer circuit 216, and LTSSM 217, which operate similarly to those elements in dual-protocol link controller 209. However, in link controller 233, no PCIe transaction layer, data link layer, or multiplexer are employed, allowing link controller 233 to only communicate with the Gen-Z protocol. PCIe physical layer circuit 216 of link controller 233 is connected to the transmission medium of PCIe bus 220 and transmits and receives Gen-Z protocol communications over PCIe bus 220. Multiple channels or a single channel may be used in the connection, running over multiple lanes of PCIe bus 220. LTSSM 217 of link controller 233 performs the functions of a PCIe LTSSM and negotiates use of the Gen-Z protocol as described below.

Memory module 230 may be used in a memory-centric architecture or a traditional, processor-centric architecture as each is supported by Gen-Z. In this example, memory 234 is a storage class memory (SCM) and is a nonvolatile memory (NVM). However, these examples are not limiting, and many types of memory modules may employ the techniques described herein. For example, a RAM memory, or a memory with mixed NVM and RAM may be used, such as a high-capacity flash storage or 3D crosspoint memory with a RAM buffer.

Media controller 232 may be integrated on an interface controller chip (231) with some or all of the port circuitry of dual-protocol link controller 209. The two LTSSMs 217 negotiate with each other during link initialization to notify host processor 210 that a Gen-Z device is present on PCIe bus 220, and to negotiate the connection protocol between host processor 210 and memory module 230. This negotiation preferably takes place as an addition to LTSSM training process that is part of PCIe link controllers as further described below.

Figure 3:
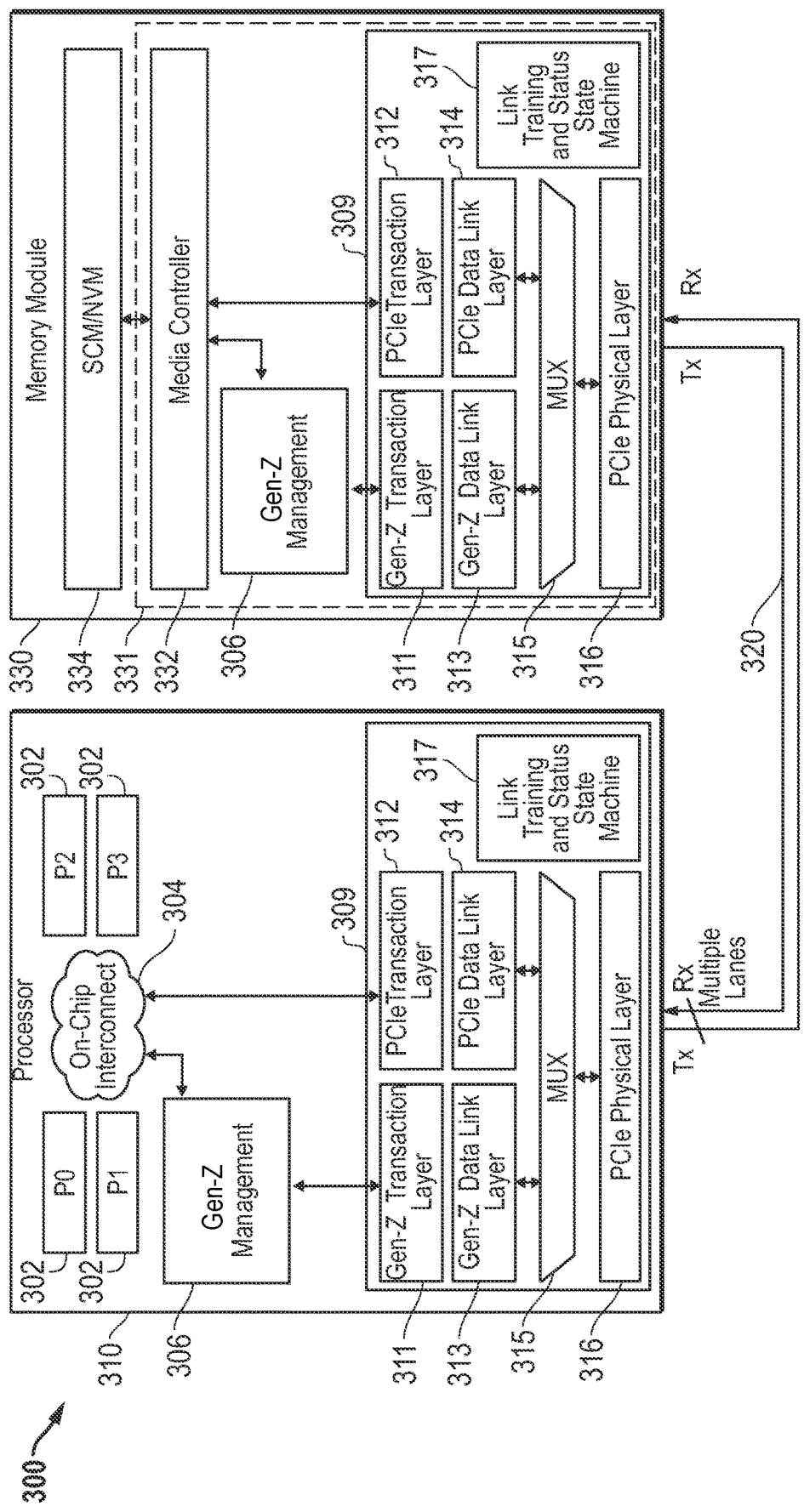
FIG. 3 illustrates in block diagram form another data processing platform according to some embodiments.

FIG. 3 illustrates in block diagram form a data processing platform 300. Generally, host processor 310 connects to a memory module 330 over a PCIe bus 320, recognizes that a Gen-Z capable device is connected, and configures the dual-protocol link controllers 309 of host processor 310 and memory module 330 accordingly. Host processor 310 is identical to host processor 210 of FIG. 2, with reference numbers to the corresponding elements beginning with "3" rather than "2".

Memory module 330 may be an expansion card type module with a PCIe connector, or may take the form of other expansion modules and or be built into the motherboard carrying host processor 310. Memory module 330 includes a memory 334 with one or more memory chips, and an interface controller 331. Interface controller 331 includes a media controller 332 and a dual-protocol link controller 309 connected to the transmission medium of PCIe bus 320. Multiple channels or a single channel may be used in the connection, running over multiple lanes of PCIe bus 320.

Media controller 332 and its associated Gen-Z management block 306 operate to fulfill and respond to memory requests formatted in the memory semantic form provided by the Gen-Z protocol. Memory module 330 may be used in a memory-centric architecture or a traditional, processor-centric architecture as each is supported by Gen-Z. In this example, memory 334 is a storage-class, nonvolatile memory similar to that of memory module 230.

Media controller 332 may be integrated on a chip with interface controller 331, with some or all of the circuitry of dual-protocol link controller 309. Dual-protocol link controller 309 has elements 311, 313, 315, 316, 317, 312 and 314 like those of dual-protocol link controller 309 of host processor 310, except that host processor 310 may include a full PCIe root complex in its dual-protocol link controller 309. The two LTSSMs 317 negotiate with each other during link initialization to notify host processor 310 that a Gen-Z capable device is present on PCIe bus 320, and to negotiate the connection protocol between host processor 310 and memory module 330 as further described below with respect to FIG. 5. Dual-protocol link controller 309 may be configured, typically through a register or pin-strap setting, to negotiate use of either a Gen-Z protocol or a PCIe protocol. This negotiation preferably takes place as an addition to LTSSM training process that is part of PCIe link controllers.

Figure 4:
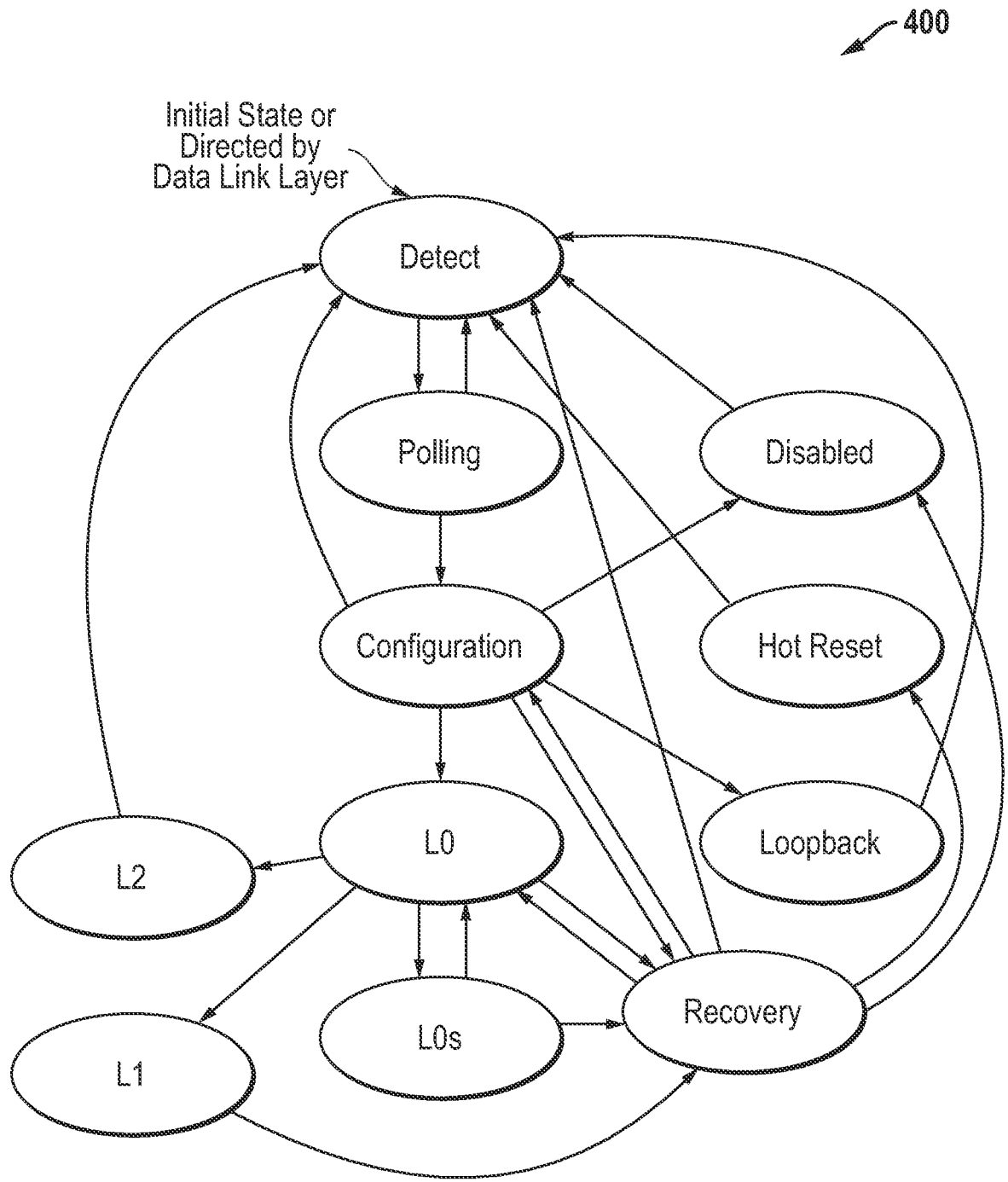
FIG. 4 shows in flow diagram form a state diagram for operating a prior art link training and status state machine (LTSSM).

FIG. 4 shows in flow diagram form a state diagram 400 for operating a prior art PCIe LTSSM. As set forth the PCIe standard, the LTSSM typically provides a physical layer control process that configures and initializes each link for operation. The LTSSM performs the functions of configuring and initializing the PCIe link, supporting packet transfers, recovering from link errors, and restarting a PCIe port from low power states. While configuring and initializing the PCIe link, the LTSSM first enters a Detect state where it detects the presence of a link partner on the lane, typically in response to the physical layer circuit being initialized, or commanded by the link layer as shown. From the Detect state, the LTSSM enters a Polling state in which bit and symbol lock, and lane polarity are established as the link partners exchange predetermined ordered sets of symbols, referred to as training set 1, "TS1" and training set 2, "TS2". These ordered sets contain patterns of bits that allow the transmitter and receiver to measure and adjust the transmitter and receiver performance over the particular transmission medium of each lane.

Then the LTSSM goes to the Configuration state, where the TS1 and TS2 ordered sets are again exchanged and parameters such as data rate, lane ordering, and link width are established. Then the LTSSM goes to the L0, which is the normal working state where data is transferred on the link. Various errors in the Configuration process can cause the LTSSM to go to through the Recovery state. The LTSSM may also go to electrical idle or standby state (L0s), lower power standby/slumber state (L1), a low power sleep state (L2), or a link Off state (L3).

Figure 5:
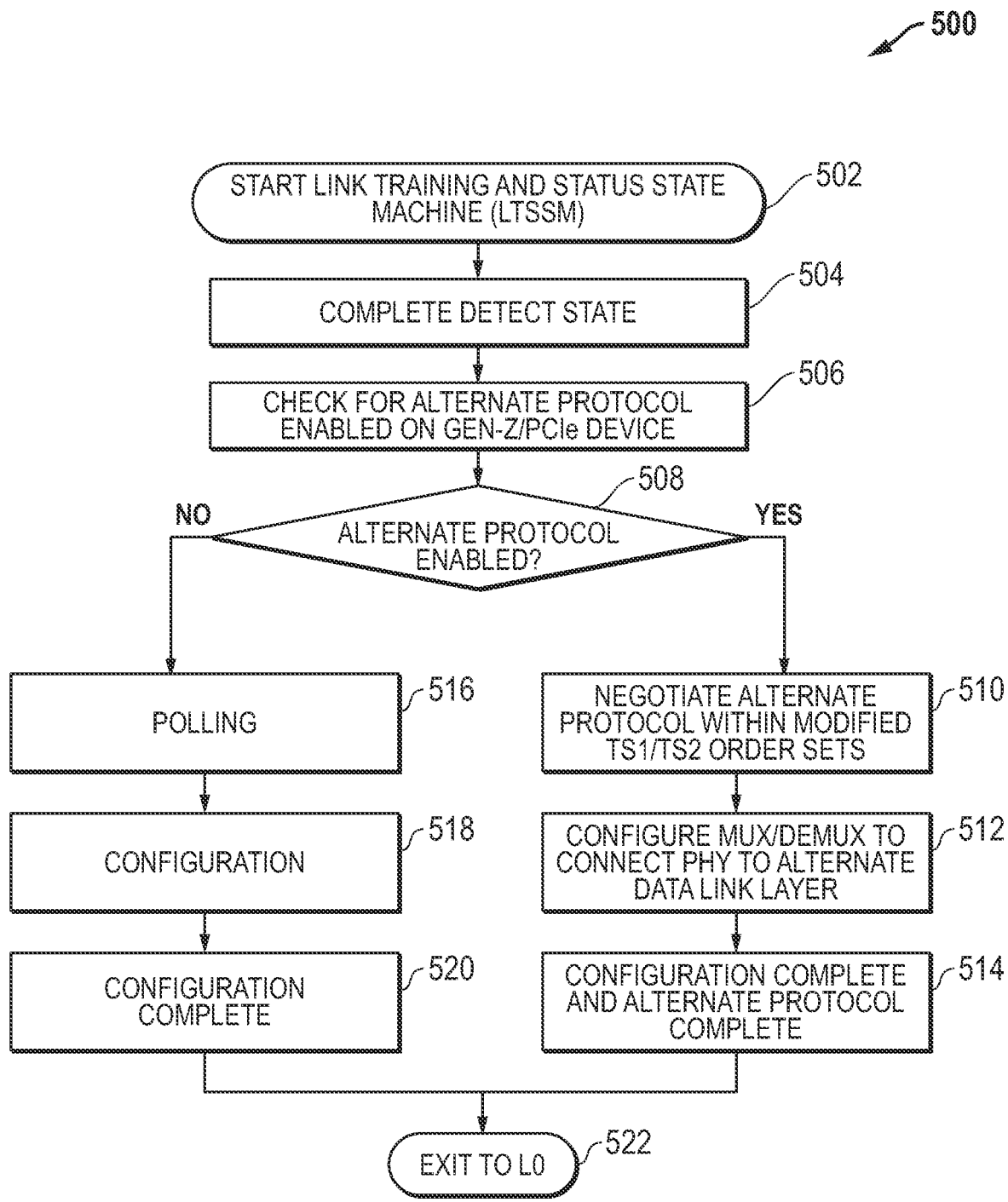
FIG. 5 shows in flow diagram form an example process for selecting an alternative protocol using an enhanced LTSSM according to some embodiments.

FIG. 5 shows in flow diagram form an example process 500 for selecting an alternative protocol using an enhanced LTSSM 317 according to some embodiments. Generally, process 500 is conducted by the enhanced LTSSM 317 controlling the PCIe physical layer circuit 316 (FIG. 3) at each end of a lane of the PCIe bus 320. Process 500 begins at process block 502 where enhanced LTSSM 317 is started, typically when the data processing platform is powered on or reset according to any suitable process, for example a cold reset or a hot reset. The enhanced LTSSM 317 may also be restarted in response to a command from the host processor, such as a command to leave a link standby state. At block 504, the enhanced LTSSM 317 completes the Detect state to detect the presence of a physical layer circuit transmitter or receiver at the opposite end of the lane. Then at block 506, enhanced LTSSM 317 checks for alternative protocols enabled on the attached device. The setting is typically initialized using a boot strap ROM, a pin set to a particular value, or some other suitable technique to set a designated value in the Gen-Z device register. Then the Gen-Z device checks the register to see that an alternative protocol, such as a Gen-Z transaction layer protocol, is enabled. The check is performed at the Gen-Z device end of the link to determine the preferred protocol with which to communicate, and may also be performed independently at the host processor end to determine whether an alternative protocol is supported or allowed. At the host processor, the setting may be stored in a register, which is checked by the PCIe root complex.

If no alternative protocols are enabled, process 500 at block 508 goes to the normal PCIe LTSSM process where it completes the polling state at block 516, the configuration state at block 518, and upon completing the link configuration at block 520, exits to the L0 operating state at block 522. Block 518 may configure multiplexer-demultiplexer 315 of both dual-protocol link controllers 309 at either end of the link to connect the PCIe data link layer controller 314 to PCIe physical layer circuit 316, or such connection may already be set as the default state. If the PCIe protocol is not enabled as a default, block 518 may also include transmitting PCIe protocol negotiation information identifying the PCIe protocol in the same manner that alternative protocol negotiation information is exchanged at block 510.

If an alternative protocol is enabled, referring to block 508, process 500 goes to block 510, where it negotiates the use of an alternative protocol by transmitting modified TS1 and TS2 ordered sets. The ordered sets are modified to insert information into the TS1 or TS2 set at the Gen-Z device end of the link indicating an alternative protocol is supported. The enhanced LTSSM 317 transmits and receives alternative protocol negotiation information over the data lane within the modified TS1 and TS2 ordered sets. The host processor 310 end of the link similarly acknowledges acceptance of the alternative protocol by inserting acknowledgement information into the TS1 or TS2 ordered set transmitted back to memory module 330.

At block 512, process 500 configures the multiplexer-demultiplexer 315 of both dual-protocol link controllers 309 at either end of the link, to connect the Gen-Z data link layer controller to PCIe physical layer circuit 316. Generally, if a Gen-Z protocol is supported at both ends of the link, the host processor 310 and memory module 330, the Gen-Z data link layer controller is used. If either end of the link only supports the PCIe protocol, then the PCIe data link layer controller 314 is used. At block 514, the configuration of the lane is completed by negotiating link speed, link width, and other relevant parameters.

This scheme enables the use of PCIe or Gen-Z communication in a manner transparent to the application layers of the system. It also allows the same physical transmission medium, the lanes of PCIe bus 320, often 16 lanes, to be used by both protocols. Because the alternative protocol negotiation is done on a lane-by-lane basis, a number of lanes may be used for a Gen-Z protocol (for example, a memory module) while other lanes are used for a PCIe protocol (for example, for peripheral devices). The techniques herein also allow for backward compatibility, as older PCIe devices do not interfere with the Gen-Z specific hardware. Further, use of these techniques within a data fabric allows processing elements multiple paths to reach a port of their choice and select a protocol of their choice.

Figure 6:
FIG. 6 shows in symbol sequence diagram form an unmodified ordered training set according to some embodiments.

FIG. 6 shows in symbol sequence diagram form an unmodified ordered training set 602 according to some embodiments. The unmodified training set generally consists of two types of symbol sets, each having 16 symbols used by the LTSSM to establish alignment and other link parameters during the Polling and Configuration states of the LTSSM.

Figure 7:
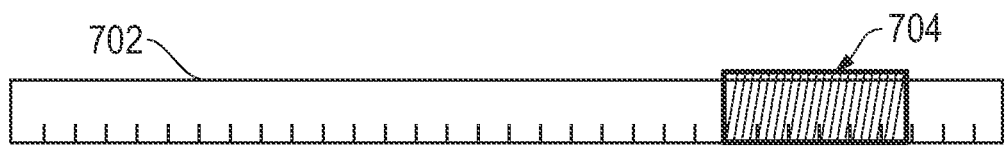
FIG. 7 shows in symbol sequence diagram from a modified ordered training set according to some embodiments.

FIG. 7 shows in symbol sequence diagram from a modified ordered training set 702 according to some embodiments. Modified ordered training set 702 may be a modified version of either or both of the TS1 or TS2 ordered training sets used by the LTSSM. Modified data 704 includes alternative link negotiation parameters, which identify the protocol to be employed, such as a Gen-Z protocol. The modified data includes at least one bit altered from the original TS1 or TS2 ordered set. The enhanced LTSSM 317 checks the position of the modified bits for altered data to determine if a modified ordered training set is received.

Figure 8:
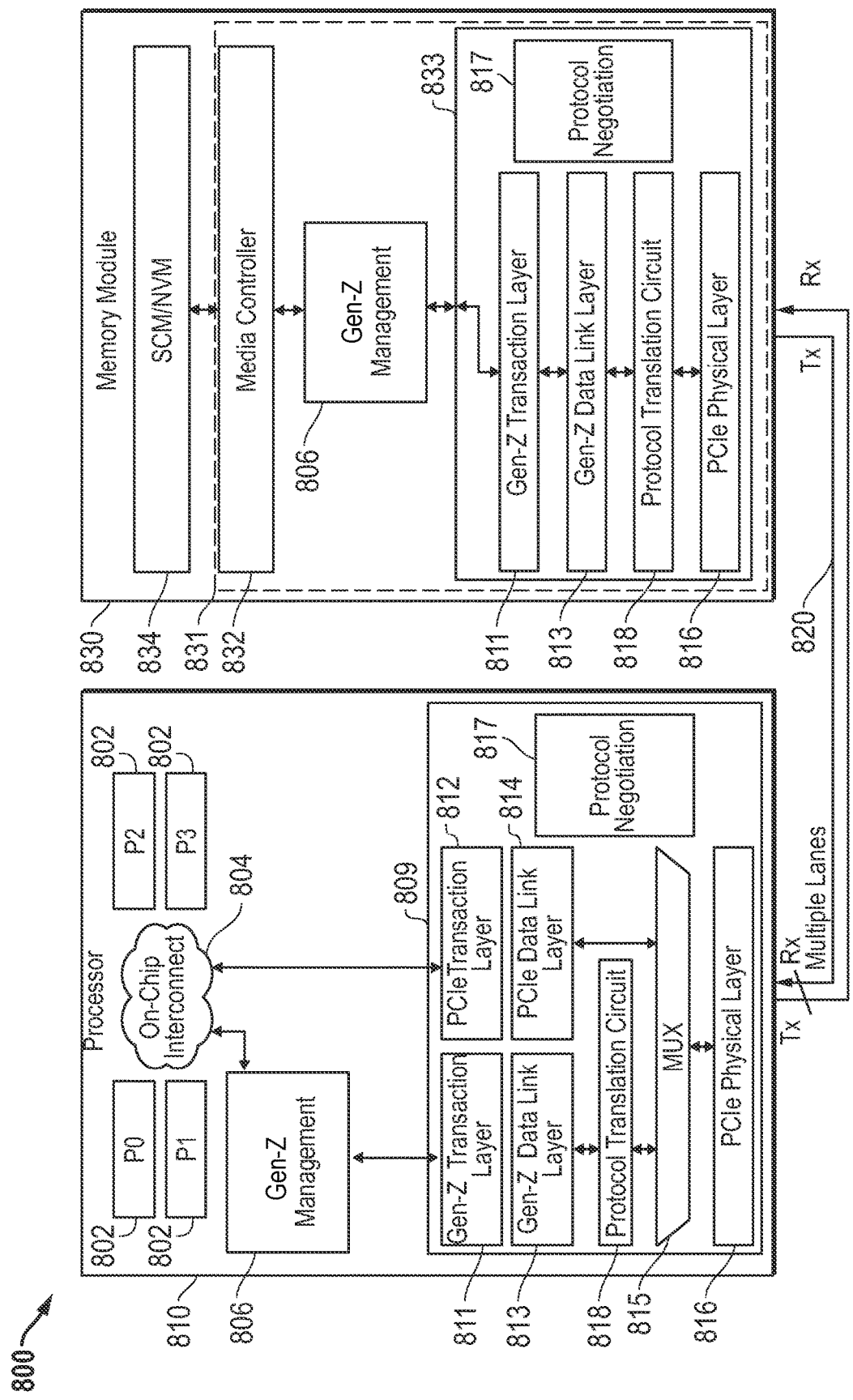
FIG. 8 illustrates in block diagram form a data processing platform according to some embodiments.

FIG. 8 illustrates in block diagram form a data processing platform 800 according to some embodiments. Generally, a host processor 810 connects to a memory module 830 over a PCIe bus 820, recognizes that a Gen-Z device is connected, and configures the dual protocol link controllers 809 of host processor 810 and dual protocol link controller 833 of memory module 830 accordingly. In this embodiment, a protocol translation circuit 818 is present in dual-protocol link controllers 809 and 833, which operates to convert or encapsulate data from the Gen-Z data link layer controller 813 with a format suitable for transmission with PCIe physical layer circuit, as further described below.

Host processor 810 has many similar elements to host processor 210 of FIG. 2, with reference numbers to the corresponding elements beginning with "8" rather than "2". The description of these elements will not be repeated unless pertinent to the present embodiment.

In this embodiment, dual protocol link controller 809 includes a Gen-Z/PCIe external port including PCIe hardware enhanced to include Gen-Z alternative protocol capability. This capability is provided by through Gen-Z management block 206, Gen-Z transaction layer controller 811, Gen-Z data link layer controller 813, protocol translation circuit 818, multiplexer-demultiplexer 815, and PCIe physical layer circuit 816. Dual protocol link controller 809 provides a Gen-Z protocol interconnect to memory module 830 that is overlaid on a PCIe physical link on PCIe bus 820.

Memory module 830 may be an expansion card type module with a PCIe connector, or may take the form of other expansion modules and or be built into the motherboard carrying host processor 810. Memory module 830 includes a memory 834 with one or more memory chips, and an interface controller 831. Interface controller 831 includes a media controller 832 and a dual protocol link controller 833 connected to the transmission medium of PCIe bus 820. Multiple channels or a single channel may be used in the connection, running over multiple lanes of PCIe bus 820. Media controller 832 may be integrated with some or all of the port circuitry of dual protocol link controller 833 of interface controller 831 on a single chip.

Media controller 832 and its associated Gen-Z protocol layer 806 operate to fulfill and respond to memory requests formatted in the memory semantic form provided by the Gen-Z protocol. Memory module 830 may be used in a memory-centric architecture or a traditional, processor-centric architecture as each is supported by Gen-Z. In this example, memory 834 is a storage-class, nonvolatile memory.

Dual-protocol link controller 833 has elements 811, 813, 816, similar to those described above with respect to FIG. 2. In this embodiment, dual protocol link controller 833 includes a protocol negotiation circuit 817, which negotiates with a similar protocol negotiation circuit 817 of dual protocol link controller 809. Protocol negotiation circuits 817 negotiate with each other during link initialization to notify host processor 810 that a Gen-Z device is present on PCIe bus 820, and to negotiate the connection protocol between host processor 810 and memory module 830. Negotiation may occur through a LTSSM as described with respect to FIG. 5, for example, or any other suitable method. Generally, protocol negotiation information is exchanged during the link setup. For example, a single bit in an ordered set exchanged during the PCIe link setup, such as a Training Ordered Set, may be modified to carry Gen-Z/PCIe protocol negotiation information.

A protocol translation circuit 818 is included in dual protocol link controller 809 and dual protocol link controller 833. In both instances, protocol translation circuit 818 is connected to Gen-Z data link layer controller 813. In the direction toward the PCIe bus 820, protocol translation circuit 818 connects to multiplexer-demultiplexer 815 in dual protocol link controller 809. In memory module 830, protocol translation circuit 818 connects to PCIe physical layer circuit 816. Protocol translation circuits 818 are preferably constructed as digital controllers including communication buffers.

Protocol translation circuit 818 of dual protocol link controller 809 generally operates to encapsulate Gen-Z formatted traffic data in a PCIe format, and pass the traffic data to PCIe physical layer circuit 816 through multiplexer-demultiplexer 815. Protocol translation circuit 818 also operates to receive encapsulated traffic data from memory module 830 and perform the reverse process, as further described below with respect to FIGS. 9-13.

Figure 9:
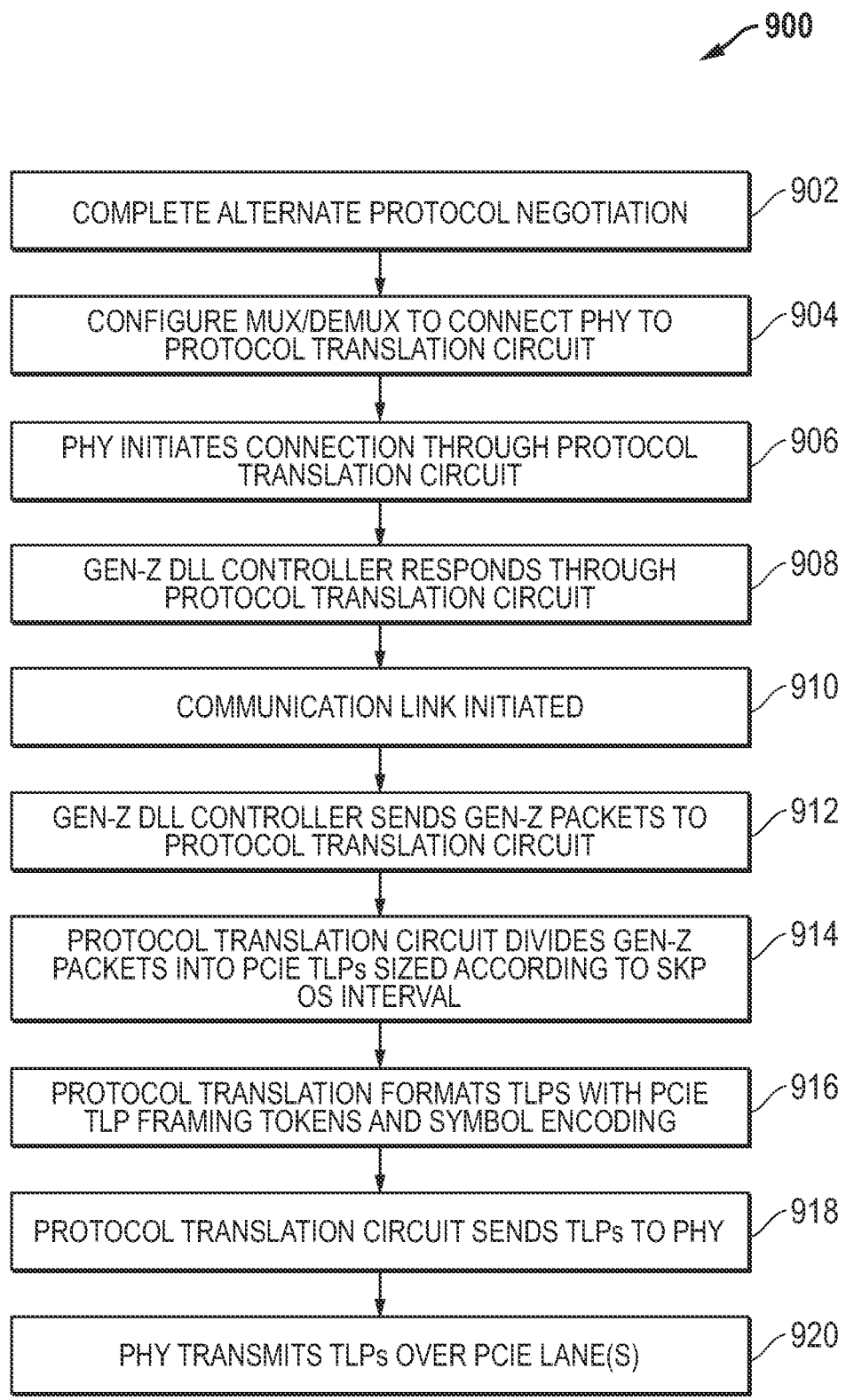
FIG. 9 shows in flow diagram form a process for operating a dual protocol link controller like that of FIG. 8 according to some embodiments.

FIG. 9 shows in flow diagram form a process 900 for operating a dual protocol link controller like that of FIG. 8 according to some embodiments. Referring to FIG. 8 and FIG. 9, process 900 begins at block 902 with the protocol negotiation circuits 817 completing the alternate protocol negotiation process to specify that a Gen-Z protocol will be used to communicate with an attached module such as a memory module 830. At block 904, multiplexer-demultiplexer 815 is configured to connect protocol translation circuit 818 to PCIe physical layer circuit 816. This connection may be commanded through a control connection to protocol negotiation circuit 817, or by a dedicated controller for dual protocol link controller 809.

Next, at block 906, PCIe physical layer circuit 816 forms a connection with the Gen-Z data link layer controller 813 through protocol translation circuit 818. In block 906, PCIe physical layer circuit 816 acts according to the PCIe protocol, asserting a digital signal to indicate a connection is available. Protocol translation circuit 818 translates this signal into the signal expected by Gen-Z data link layer controller 813. At block 908, Gen-Z data link layer controller 813 responds to the initiation through protocol translation circuit 818. The response typically includes asserting a digital signal to PCIe physical layer circuit 816 in a manner expected under normal link initialization procedures for a PCIe link. At this point the communications link is initiated as indicated at block 910, and link controls activity such as releasing credits may occur.

At block 912, Gen-Z data link layer controller 813 sends traffic data in packets to protocol translation circuit 818 formatted in a Gen-Z format. This includes header information arranged as if protocol translation circuit 818 were a Gen-Z physical layer circuit. Protocol translation circuit 818 then encapsulates the traffic data, including the Gen-Z formatting information, into a PCIe format at blocks 914 and 916. Block 914 includes dividing or grouping the Gen-Z packets into chunks sized for PCIe transaction layer packets (TLP). By encapsulation, it is meant that the Gen-Z data, along with its associated framing, is exactly reproduced at the receiver end of the data link, after being transmitted within the PCIe format. This provides a physical layer transmitter that allows the Gen-Z protocol to be used with a PCIe physical layer, transparent to the Gen-Z protocol layers.

Preferably, protocol translation circuit 818 operates to format the TLPs such that a TLP transmission does not extend beyond an interval between a selected PCIe skip ordered set (SKP OS) and a subsequent SKP OS required by PCIe physical layer circuit 816. This is not to say that a single TLP or a number of TLPs must exactly fill the gap. For example, the gap may be filled by a number of TLPs of the largest size available, plus one smaller TLP to fill the gap to where an SKP OS is expected to be requested, followed by a number of logical idle symbols which are used until the SKP OS is actually begun. At block 916, protocol translation circuit 818 operates to prepare PCIe-formatted transaction layer packets (TLPs) including data from one or more Gen-Z packets and PCIe TLP framing data or tokens. Protocol translation circuit 818 operates to express the data from the one or more Gen-Z packets with PCIe symbols.

At block 918, protocol translation circuit 818 sends the prepared TLPs to PCIe physical layer circuit 816. At block 920, the TLPs are transmitted over the communication link to memory module 830. Such transmission may occur over one or more PCIe lanes, depending on the configuration of PCIe bus 820.

It is noted that while the steps are depicted in a certain order, this order is not limiting and many of the operations happen simultaneously when transmitting data. The depicted process exemplifies establishing an outgoing communication link, for example from host processor 810 to memory module 830. A similar process typically happens at dual protocol link controller 833 of memory module 830 to establish a return data link for two-way communication.

Figure 10:
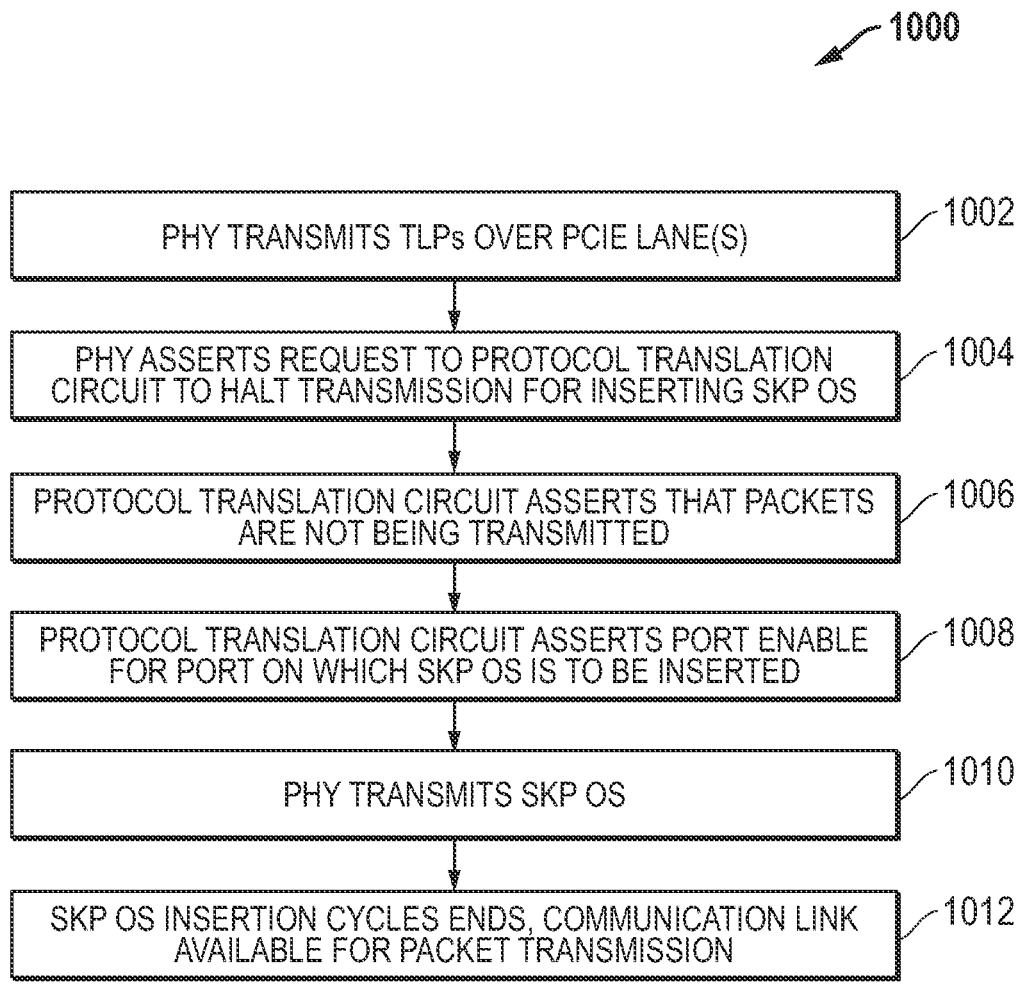
FIG. 10 shows in flow diagram form another process for operating a dual protocol link controller according to some embodiments.

FIG. 10 shows in flow diagram form another process 1000 for operating a dual protocol link controller according to some embodiments. The depicted process handles certain flow control procedures that are part of the PCIe protocol. In particular, PCIe protocols defines special symbols that can be inserted as SKP (skip) symbols which are only found in SKP ordered-sets (SKP OS). For example, a transmitted SKP OS may include a single COM symbol followed by a number SKP symbols. In PCIe, transmitters are required to insert SKP OS's into the transmitted data stream periodically to prevent an overflow or underflow condition in the receiver buffer, because the clocks used at the transmitter and receiver may not be exactly matched. In some embodiments, protocol translation circuits 818 like those of FIG. 8 handle such insertions according to process 1000.

Referring to FIG. 8 and FIG. 10, at block 1002, TLPs are being transmitted by the PCIe physical layer circuit 816. At some point during such transmission, depending on clock rates and buffer states, PCIe physical layer circuit 816 asserts a request to protocol translation circuit 818 to halt transmission for inserting an SKP OS as shown at block 1004. Protocol translation circuit 818 receives the request and finishes transmitting any packets that are currently being transmitted, then halts packet transmission to allow the PCIe physical layer circuit to insert a SKP OS. Protocol translation circuit 818 typically signals back to PCIe physical layer circuit 816 that packets are not being transmitted, as shown at block 1006. This signaling is typically done by asserting a digital signal. Protocol translation circuit 818 may also assert a port enable signal for a port on which the SKP OS is requested to be inserted, as shown at block 1008.

At block 1010, PCIe physical layer circuit 816 transmits one or more SKP OS's, inserting them into the transmitted traffic stream. The number of SKP OS's may vary as to mitigate buffer problems on the receiver end of the transmission link. After the SKP OS insertion is over, the communication link is reestablished, and packet transmission continues as shown at block 1012.

While this process is given as an example, protocol translation circuit 818 may handle other procedures required by PCIe physical layer circuit 816 that are not handled by a Gen-Z link layer controller. As such, protocol translation circuit 818 is generally adapted to receive a signal or indicator that a particular PCIe action is required for operation of the data link over PCIe physical layer circuit 816, and provide a response to PCIe physical layer circuit 816 to resolve the requirement. This type of process is performed by protocol translation circuits 818 at both the transmitting and receiving ends of the data link.

Figure 11:
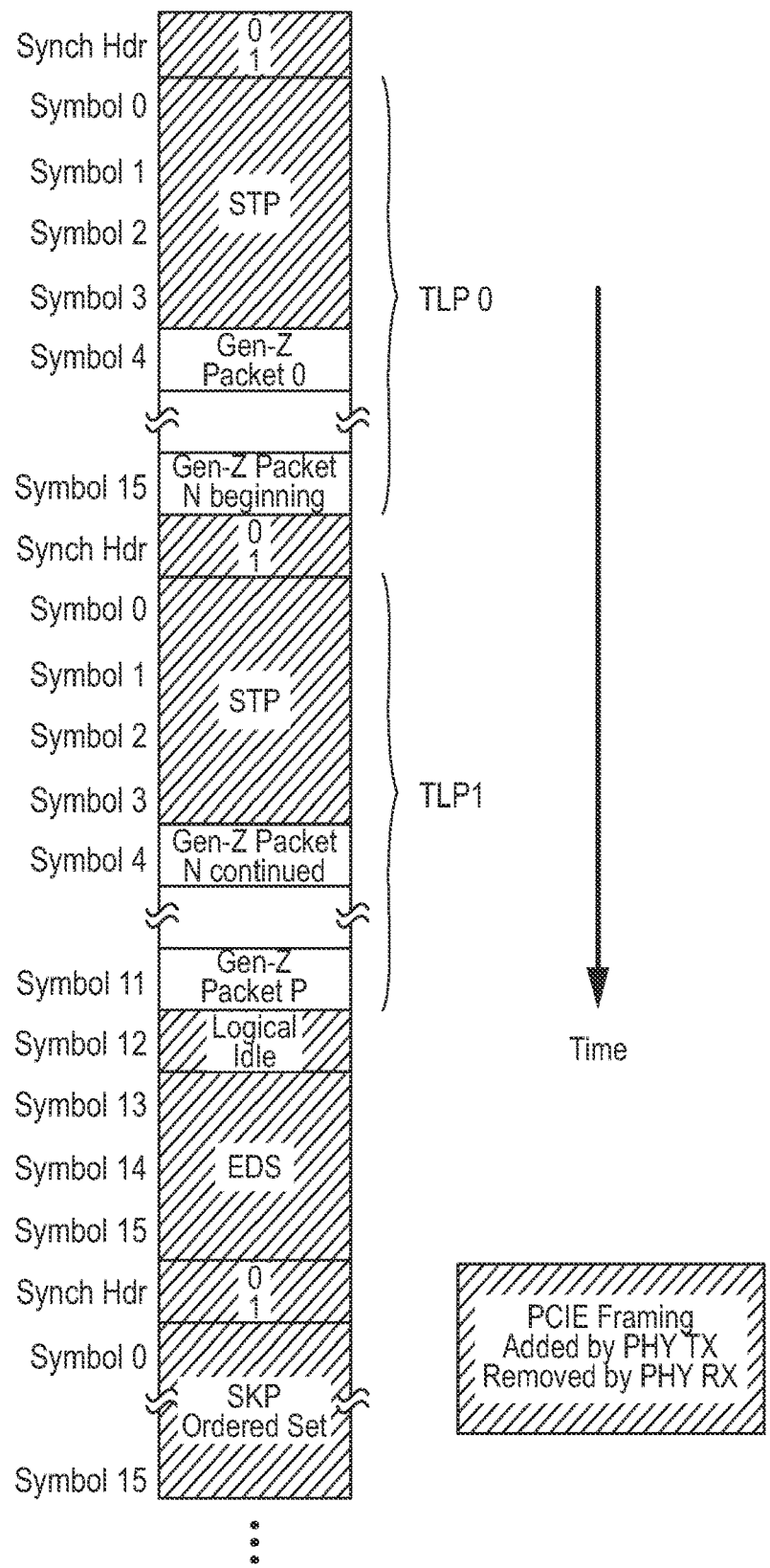
FIG. 11 shows in diagram form a sequence of transmitted data on a PCIe data link according to some embodiments.

FIG. 11 shows in diagram form a sequence 1100 of transmitted data on a PCIe data link according to some embodiments. Sequence 1100 may be transmitted, for example, in a system arranged like that of FIG. 8, but with only a single PCIe data lane used in each direction to establish a data link (an "×1" link) over PCIe bus 820. Once the PCIe physical layer circuit 816 transitions to the active state, known as the PHY-Up state, Gen-Z packets are transmitted over the data link encapsulated in PCIe TLPs in the manner shown. PCIe framing is included to follow the PCIe protocol and encapsulate the Gen-Z traffic data.

In sequence 1100, TLPs labeled as TLP 0-TLP P are transmitted, separated with a synch header, shown as "Synch Hdr." Each TLP starts and at least one STP token, or in this case four STP tokens as can be seen filling the first four transmitted symbols of TLP 0 and TLP 1. The TLPs may encapsulate one or more consecutive Gen-Z packets, including partial Gen-Z packets. Gen-Z packets may span TLP boundaries, as depicted by Gen-Z packet N, which begins at symbol 15 of TLP 0 and is continued and completed in TLP 1 symbols 4 through 10.

Generally the structure of the TLPs follows PCIe standards. TLP length is within the minimum and maximum TLP length requirements as specified by the PCI Express Base Specification. PCIe Ordered-Sets and PCIe Framing Tokens, as used in the PCIe standards, are removed from received data before transmitting the received data to Gen-Z data link layer controller 813. Additional format restrictions may also be applied that conform to PCIe standards but place further rules on the format. As described with respect to FIG. 10, SKP OS's may be inserted in the data stream between TLPs. Where such insertion is required, Gen-Z packet transmission is halted to insert SKP Ordered-Sets as specified by the PCIe Base Specification. Gen-Z packet transmission halts when the data stream needs to transmit SKP ordered-sets or other ordered sets associated with PHY link management or link state transitions, as depicted at the end of sequence 1100.

Sequence 1100 uses 128b/130b PCIe encoding. Generally, PCIe physical layer circuit 816 supports PCIe data framing using the 8b/10b or 128b/130b PCIe encoding rules, as required. The requirements of PCIe that relate to link layer functionality are not followed, because they are subsumed or rendered irrelevant by the use of Gen-Z data link layer controller 813. The LCRC (link cyclic redundancy check), which is normally generated by the transmitter or checked at the receiver, is not used. Instead, Gen-Z packet data occupies the location where LCRC is normally located. Also, TLP sequence numbers are always 0, and PCIe packet retry is not used. Instead, Gen-Z retry mechanisms are used for transient error recovery, and Gen-Z ECRC (end-to-end CRC), PCRC (prelude CRC) and optional flit CRC are used for Gen-Z packet protection and packet boundary determination. All framing rules specified in the PCI Express Base Specification regarding STP, IDL (idle symbol), EDS (end data stream symbol), and Ordered-Sets are followed.

The TLPs in sequence 1100 start with an STP token with the TLP length, ECRC, and parity and a TLP sequence number of 0. The STP tokens followed by scrambled and 128b/130b encoded data blocks containing Gen-Z packets from the Gen-Z Core. Received 128b/130b data symbols are decoded and descrambled from TLPs as specified by the PCI Express Base Specification to un-encapsulate the Gen-Z packets.

Figure 12:
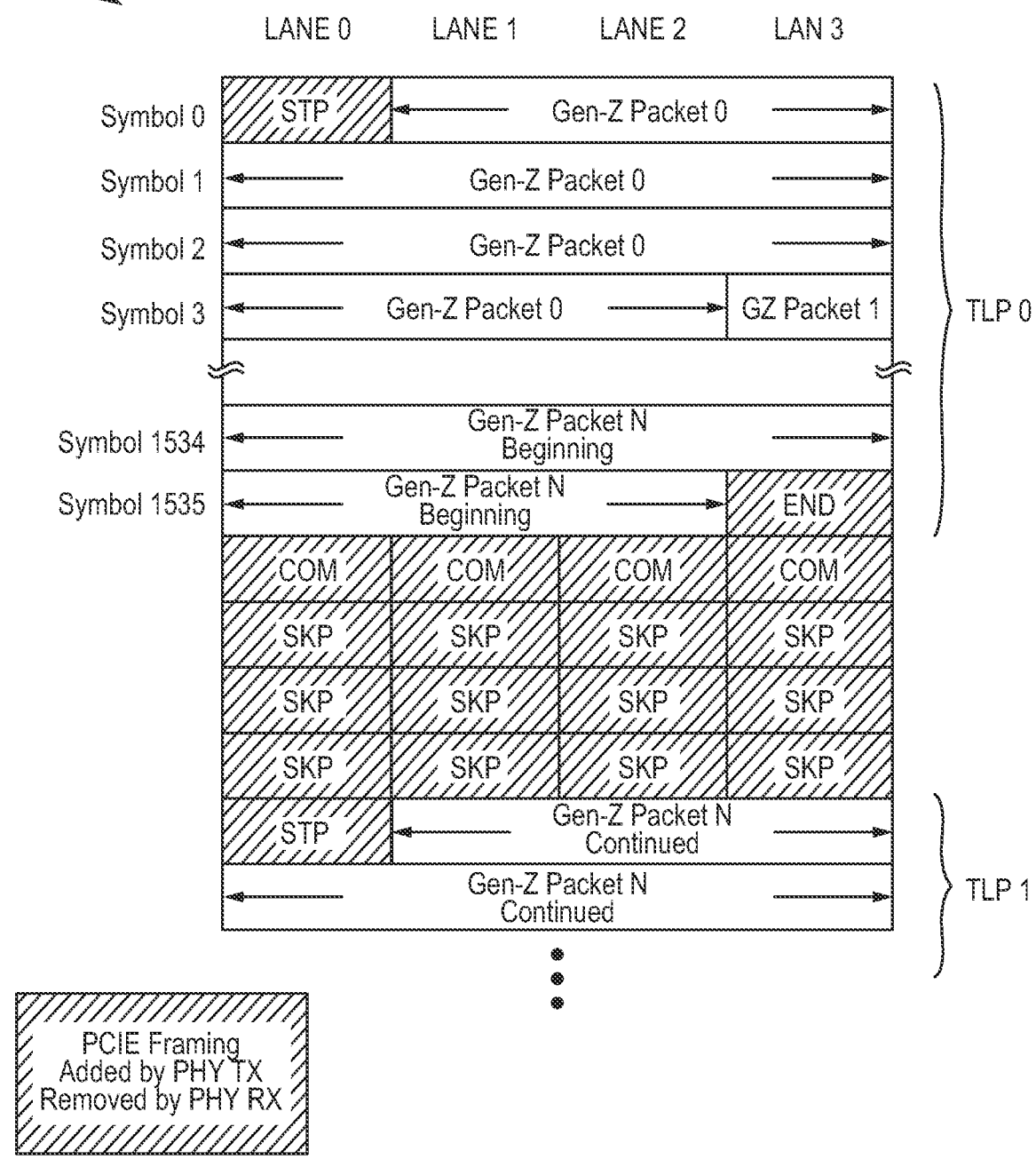
FIG. 12 shows in diagram form another sequence of transmitted data on another PCIe data link according to some embodiments.

FIG. 12 shows in diagram form another sequence 1200 of transmitted data on another PCIe data link according to some embodiments. Sequence 1200 is an example of data transmitted using four PCIe data lanes (an "×4" link) to transmit data over PCIe bus 820, with the lanes depicted across the table horizontally and the symbols transmitted in each timeslot shown vertically down the page.

As shown in sequence 1200, the start of a TLP with a STP symbol followed by a Gen-Z packet stream. TLP 0 includes Gen-Z packets 0-M, and part of packet N, with the remainder of packet N transmitted in TLP 1. Since this example sequence is 8b/10b encoded, synch headers are not used. The encapsulated Gen-Z packet data scrambled and encoded as data symbols using 8b/10b scrambling and encoding rules for TLP packets as specified by the PCI Express Base Specification. At the end of the TLP, the four bytes of LCRC typically required by PCIe are replaced by four bytes of a Gen-Z packet stream, and followed by an END symbol to end the TLP. Received 8b/10b data symbols are decoded and descrambled as specified by the PCI Express Base Specification to de-encapsulate Gen-Z packets.

In this example, the buffer conditions of the receiver require that SKP ordered sets be transmitted over the data link. As can be seen after symbol 1535, transmission of Gen-Z packets is halted and a sequence of COM and SKP symbols are transmitted by the PCIe physical layer circuit. Then the transmission resumes with TLP 1, picking up partially through Gen-Z packet N and continuing transmission.

While the encoding used is 8b/10b encoding for this example, 128b/130b encoding may also be used with multiple data lanes. Future physical layer encoding schemes may also be used. Generally, all supported data widths in PCIe may be used with the techniques herein, including those widths achieved by data striping.

The techniques herein may be used, in various embodiments, with any suitable products (e.g. servers, data processing computers, database hosts) that employ memory modules or other peripherals that benefit from high speed communication links. Further, the techniques are broadly applicable for use in data processors implemented with GPU and CPU architectures or ASIC architectures, as well as programmable logic architectures.

While particular embodiments have been described, various modifications to these embodiments will be apparent to those skilled in the art. For example, various kinds of modules may benefit from using the link controller designs herein.

The systems and circuits depicted in FIG. 2, FIG. 3, and FIG. 8 may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

Accordingly, it is intended by the appended claims to cover all modifications of the disclosed embodiments that fall within the scope of the disclosed embodiments.

What is claimed is:

1. A link controller comprising:
   a Peripheral Component Interconnect Express (PCIe) physical layer circuit coupled to a communication link and providing a data path over said communication link;
   a first data link layer controller which operates according to a PCIe protocol;
   a second data link layer controller which operates according to a non-PCIe protocol;
   a multiplexer-demultiplexer coupled to the first data link layer controller and the PCIe physical layer circuit; and
   a protocol translation circuit coupled to the multiplexer-demultiplexer and the second data link layer controller, the protocol translation circuit receiving traffic data from the second data link layer controller in a non-PCIe format, encapsulating the non-PCIe format traffic data in a PCIe format, and passing the encapsulated traffic data to the multiplexer-demultiplexer.

2. The link controller of claim 1, wherein the protocol translation circuit receives an indication from the PCIe physical layer circuit that the communication link is ready to initiate a connection, transmits an indication to the PCIe physical layer circuit to initiate a connection, and during the connection passes only data from the second data link layer controller through the multiplexer-demultiplexer to the PCIe physical layer circuit.

3. The link controller of claim 1, wherein the protocol translation circuit operates to prepare PCIe-formatted transaction layer packets (TLPs) including data from one or more non-PCIe packets and PCIe framing data.

4. The link controller of claim 3, wherein the protocol translation circuit operates to format the TLPs such that a TLP transmission does not extend beyond an interval between a selected PCIe skip ordered set (SKP OS) and a subsequent SKP OS required by the PCIe physical layer circuit.

5. The link controller of claim 3, wherein the protocol translation circuit operates to express the traffic data from the one or more non-PCIe packets with PCIe symbols.

6. The link controller of claim 1, wherein the protocol translation circuit receives a request from the PCIe physical layer circuit to provide a gap in data transmission for inserting a PCIe skip ordered set (SKP OS), and in response, halts packet transmission to allow the PCIe physical layer circuit to insert a SKP OS.

7. The link controller of claim 1 further comprising a protocol selection circuit which selectively controls the PCIe physical layer circuit to:
   transmit and receive alternative protocol negotiation information over the communication link; and,
   in response to receiving the alternative protocol negotiation information, cause the multiplexer-demultiplexer to selectively couple the PCIe physical layer circuit to the second data link layer controller.

8. A method comprising:
   selectively causing a multiplexer-demultiplexer to couple a Peripheral Component Interconnect Express (PCIe) physical layer circuit through a protocol translation circuit to a non-PCIe data link layer controller; and
   at the protocol translation circuit, receiving traffic data from the non-PCIe data link layer controller in a non-PCIe format, encapsulating the non-PCIe format traffic data in a PCIe format, and passing the encapsulated traffic data through the multiplexer-demultiplexer to the PCIe physical layer circuit; and
   transmitting the encapsulated traffic data over a communication link from the PCIe physical layer circuit.

9. The method of claim 8, further comprising, at the protocol translation circuit, receiving an indication from the PCIe physical layer circuit that the communication link is ready to initiate a connection, transmitting an indication to the PCIe physical layer circuit to initiate a connection, and during the connection passing only data from the non-PCIe data link layer controller through the multiplexer-demultiplexer to the PCIe physical layer circuit.

10. The method of claim 8, further comprising, at the protocol translation circuit, preparing PCIe-formatted transaction layer packets (TLPs) including data from one or more non-PCIe packets and PCIe framing data.

11. The method of claim 10, further comprising, at the protocol translation circuit, expressing the data from the one or more non-PCIe packets with PCIe symbols.

12. The method of claim 10, further comprising, at the protocol translation circuit, formatting the TLPs such that a TLP transmission does not extend beyond an interval between a selected PCIe skip ordered set (SKP OS) and a subsequent SKP OS required by the PCIe physical layer circuit.

13. The method of claim 10, further comprising, at the protocol translation circuit, receiving a request from the PCIe physical layer circuit to provide a gap in data transmission for inserting a PCIe skip ordered set (SKP OS), and in response, halting packet transmission to allow the PCIe physical layer circuit to insert a SKP OS.

14. The method of claim 8, further comprising,
   transmitting and receiving alternative protocol negotiation information over the communication link; and,
   in response to receiving the alternative protocol negotiation information, causing the multiplexer-demultiplexer to couple the PCIe physical layer circuit through a protocol translation circuit to the non-PCIe data link layer controller.

15. A data processing platform comprising:
   a central processing unit;
   a dual-protocol link controller coupled to said central processing unit and comprising:
      a Peripheral Component Interconnect Express (PCIe) physical layer circuit coupled to a communication link and providing a data path over said communication link;
      a first data link layer controller which operates according to a PCIe protocol;
      a second data link layer controller which operates according to a non-PCIe protocol;
      a multiplexer-demultiplexer coupled to the first data link layer controller and the PCIe physical layer circuit; and
      a protocol translation circuit to the multiplexer-demultiplexer and the second data link layer controller, the protocol translation circuit receiving traffic data from the second data link layer controller in a non-PCIe format, encapsulating the non-PCIe format traffic data to a PCIe format, and passing the encapsulated traffic data to the multiplexer-demultiplexer.

16. The data processing platform of claim 15, wherein the protocol translation circuit receives an indication from the PCIe physical layer circuit that the communication link is ready to initiate a connection, transmits an indication to the PCIe physical layer circuit to initiate a connection, and during the connection passes only data from the second data link layer controller through the multiplexer-demultiplexer to the PCIe physical layer circuit.

17. The data processing platform of claim 15, wherein the protocol translation circuit operates to prepare PCIe-formatted transaction layer packets (TLPs) including data from one or more non-PCIe packets and PCIe framing data.

18. The data processing platform of claim 17, wherein the protocol translation circuit operates to format the TLPs such that a TLP transmission does not extend beyond an interval between a selected PCIe skip ordered set (SKP OS) and a subsequent SKP OS required by the PCIe physical layer circuit.

19. The data processing platform of claim 17, wherein the protocol translation circuit receives a request from the PCIe physical layer circuit to provide a gap in data transmission for inserting a PCIe skip ordered set (SKP OS), and in response, halts packet transmission to allow the PCIe physical layer circuit to insert a SKP OS.

20. The data processing platform of claim 15, further comprising:

a memory module comprising a memory, a media controller coupled to the memory, and an interface controller coupled to the media controller and the communication link, a second PCIe physical layer circuit communicatively coupled to a second non-PCIe data link layer controller through a second protocol translation circuit.

* * * * *